Figure 2:
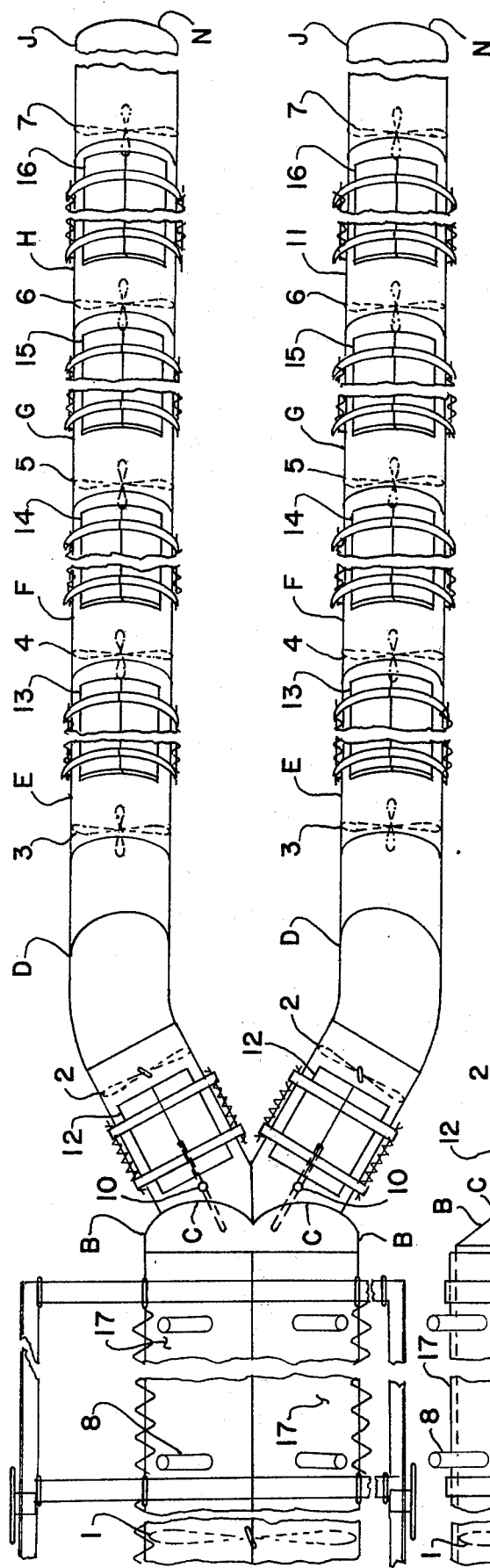
Figure 1:
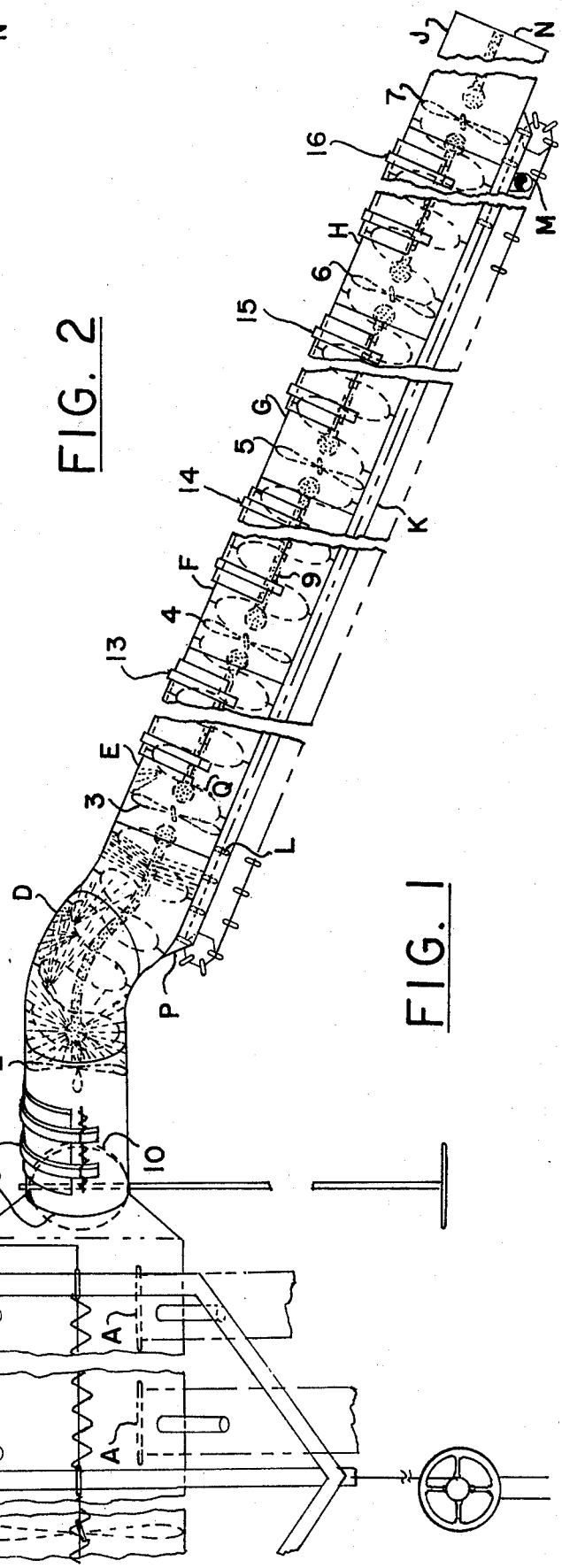

United States Patent [19]

Short, Jr.

[11] 3,972,697

[45] Aug. 3, 1976

[54] AIR POLLUTION CONTROL SYSTEM

[76] Inventor: Paul Frank Short, Jr., P.O. Box 3030, Hueytown, Ala. 35020

[22] Filed: May 14, 1975

[21] Appl. No.: 556,772

[52] U.S. Cl. .................................. 55/242; 55/261; 55/310; 261/DIG. 9; 261/79 A; 261/2; 261/17; 261/64 R
[51] Int. Cl.² ...................................... B01D 47/06
[58] Field of Search ............ 55/220, 242, 238, 310, 55/430; 261/DIG. 30, DIG. 9, 17, 79 A, 64 R, 2

[56] References Cited
UNITED STATES PATENTS

| | | | |
|---|---|---|---|
| 906,423 | 12/1908 | Hochman | 261/DIG. 9 |
| 1,639,179 | 8/1927 | Hamel | 261/17 |
| 1,969,627 | 8/1934 | Simon | 261/17 |
| 3,740,932 | 6/1973 | Cullom | 55/269 |
| 3,797,204 | 3/1974 | Cavatassi | 55/228 |

Primary Examiner—Bernard Nozick

[57] ABSTRACT

A plurality of jointly assembled standardized conduction tube segments; one end of which is in communication with the emissions conduit collector means which collector being attached to the plant emissions exhaust orifice or flue stack means and the opposite end of said conduction tube assembly serving as a clean air exhaust orifice. Each conduction tube segment wall externally supports a pressure relief means and said tube internally supports, near its intake end, an axial flow vacuum fan immediately aft of which is supported a helical spiral of high pressure liquid multi-spray nozzles which said liquid is in contact with vacuumed pollutant emissions. The said pollutants (particulates and liquid soluble gasses) being extracted thereby said spray liquid encapsulation and subsequently deposited into conveyor channel thereunder sprays and which channel is in communication with bottom of conduction tube assembly.

4 Claims, 2 Drawing Figures

U.S. Patent  Aug. 3, 1976  3,972,697

AIR POLLUTION CONTROL SYSTEM

This invention relates to a pollution control device. It has for its main objects to provide such a device that will be highly satisfactory for the purpose intended, simple in structure, comparatively cheap to manufacture, easy to maintain and very durable.

Further objects and advantages are as follows

The invention is designed primarily to provide an improved method of extracting sulphur oxide (SO) and its subsequent derivated combinations from residual emissions of combustion exhaust stacks, pipes, manifolds and other mechanical emissions collection exhausts.

Especially significant is that the device embodies and embraces certain mechanical methods, processes and physical design for removing many other types of emitted pollutants such as particulate matter, liquified mists, gases and most any other air polluting and/or air contaminating agents emitted or discharged as residue from combustion exhaust stacks.

The device is adequate in that it removes a broad margin gaseous and particulate emissions from combustion residue of industrial plants and other types of emissions exhaust stacks and pipes.

The device is expedient in that it lends itself easily to automation.

It is dependable for a high degree of continuous service in that it employs redundant controls for all automated systems whose malfunction would present a hazard to safety or uninterupted service.

The device embraces a high degree of safety in that it has designed in features such as pressure relief doors in top side of conduction spray tubes said doors strategically positioned in an arbitrary transition or neutral zone equal distance between two axial fans where theoretically pressure and vacuum are in equilibrium an area conducive to gaseous explosions. Similar doors are designed into the combustion emissions exhausts stacks conduit collector where pressure relief doors serve the same purpose but temperature is much greater. In addition to torsional hinges these doors are manually operated by means of cross levers attached to a cable thence to hand controlled cable drum on ground for manually opening in case of emergency mechanical malfunction of any part of system. These doors can be immediately thrown open for combustion emissions exhaust stacks to disperse their pollutants into stomosphere. It also employs manual controlled pressure supply line valves for emergency use when motor control valve malfunctions. The device is versatile in that it can be manually or automatically operated at variable speeds and at full or half capacity in continuous or intermittent service. The conduction spray tube assembly units are designed to operate preferably in varied diagonal positions but they are adaptable in order of preferance to horizontal, radial or arched and vertical or two systems either dual or single in opposition to each other. As the dual system can be separated and operated as independent entities in opposition to each other but jointly connected at opposite ends of a common residue conduit collector.

This invention may be embodied in other specific forms with out departing from the basic or essential characteristics thereof. The present embodiments are, therefore, to be considered respectfully illustrative and not restrictive, the scope of the invention being indicated by appended claims rather than by the foregoing description, and all changes which come within the meaning and range of duplicity of the claims, are therefore intended to or embraced therein.

The main body of conduction spray tubes consists of multiple segments of pipe or tubing. Segments or sections of tube or pipe being welded or bolted sealed together end to end and in concentricity to each other (exception of bend) and preferably positioned in a straight tubular longitudinal assembly unit with permanent erection on a diagonal angle to ground elevation the lower end of conduction tube assembly orifice being clean air exhaust and the upper end of said tube assembly being mechanically fastened or welded to another like tube assembly lying parallel on same elevation with said first tube assembly thence both integrated tube assemblies welded to exhaust end of residue emissions conduit collection chamber enclosing residue emissions exhaust stacks.

Inside the conduction tube spray chambers are appropriate axial multi-blade fans mounted to a circular cross-braced ring braket which ring inturn is mounted to inside circumferential surface of said spray tube wall; fans are mounted in forced-air exhaust positions and in numbers appropriate to C.F.M. of vacuum to be pulled as this equal spacing in series or in tandem of fans creates the desired continuous vacuum and creates multiple cleansing or saturation chambers for molecular mixture of water and gases and particulate pollutants.

Mounted with appropriate stand-off spacers inside surface circumference of conduction tube spray chambers and continuously between and concentric to fan blades in said chambers is mounted a helical section of appropriate diameter tubing studded or mounted equally spaced on helical pitch line with small high pressure fittings with capillary or micro-orifices covering tubing continuously from end to end with tube closed at each end of section.

Concentric to longitudinal center line of aforesaid chamber walls is mounted a sludge flush section of straight pipe fitted perforation fashion with larger orificed high pressure fittings spaced in positions from end to end of pipe where sludge and scale formations are more dense, each end of said pipe being welded closed with the appropriate perforated face angle cone with cone apex being directed toward center of fan hub or shaft in such a manner that spray orifices completely immerse fan blades on front and rear for sediment and sludge purging; these sludge flush lines are mounted between each axial fan and fore and aft of end fans for full coverage.

Immediately on outside walls of conduction spray tube chambers are separate high pressure water supply lines supplying water or liquid to each helical tubular spray section and to each straight section of sludge flush pipe. Half way or equal distance between each axial fan an arbitrary zone where theoretically force and vacuum effect an equilibrium there are mounted on said spray chambers outside walls torsional spring loaded hinged double doors for pressure relief said doors swinging open in opposing positions to each other and closing back together at a common seam or clearance gap opening.

On one end of horizontal and lateral base structural support of said chambers are mounted electric drive motors properly aligned and geared to drive shafts of axial fans.

Designed in the bottom of conduction tube spray chamber assembly is a rectangular guide channel to guide sludge collection conveyor which conveyor discharges at high end of said chamber assembly thereby allowing liquid residue to gravity flow to low end discharge for disposition or reclamation.

For various angles of inclination conveyor chain employs tension idlers on inside and outside of chamber to control slack and sag in conveyor chain.

Immediately inside each orifice intake of each of the dual conduction spray tube assemblies and in area of their intersections with each other and with emissions conduit collection chamber are positioned volume intake control dampers, motor controlled.

SUMMARY OF THE INVENTION

Having herein described and illustrated my invention I claim: A pollution control system especially for SO Sulphur Oxide extraction and SO2 Surphur Dioxide and other pollutant matter which system has for its main body two lengthy cylindrical tubes of metal or masonry materials; the dual tubes running parallel and being structurally supported on an incline thence bending inward toward each other on long slant until they intersect each other at intake ends and simultaneously intersect the residue exhaust conduit collector which is in communication with the stacks.

Attached to and along bottom of dual conduction tube assemblies is welded or otherwise fastened a square or rectangular channel extending from end exhaust clean air orifice to just forward of first axial intake fan whereat conveyor discharges particulate or solid residue, thus allowing counter flow of liquid residue to near discharge clean air exhaust orifice. In area where dual conduction spray tube assemblies intersect stack exhaust residue emissions conduit collector and just inside each intake orifice of twin dual tubes is positioned a volume and velocity flow control damper which dampers are metal plate discs mounted vertically and attached diametrically to round verticle rods thence the top of each rod is inserted through a provisional hole and bearing where power motor may be conveniently attached. The bottom of rod is extended thru provisional hole and bearing of bottom wall of main body dual tube thence on to manual opeation level approx. 4 feet from ground level where hand control handle is attached.

Immediately between the axial fans and fore and aft of each end fan and positioned at regular intervals on a circumferential helical center line around inside wall of each dual conduction spray tube chamber is positioned stand-off spacers and to these spacers is attached helical sections of high pressure spray tubing which tubing spirals are studded from end to end, on a helical center line around outside circumference of said high pressure spray, tube with capillary drilled and orificed micromist spray heads or fittings and each end of the high pressure helical tubing being closed and water supply line entering from center of section.

Inside conduction spray chambers are positioned sections of straight pipe properly supported and fittd with high pressure spray nozzles or just drilled holes in perforation fashion or patterns around outside circumference and extending in regular or irregular lines or rows from end to end of said straight pipe section. Ends of each section of pipe terminating just short of axial fan hub centers both fore and aft. Pipe ends are thence welded closed with perforated and orificed conical caps. Conical caps having correct slant surface where by pressure spray completely covers fan hubs and blades thus by this arrangement all sludge is purged from fans surfaces and inside walls of conduction tube spray chambers as comes within spray range of each straight section of perforated pipe. Supply lines being branched from a main high pressure manifold which in turn is served by an independent and adequate high pressure pump and motor.

Axial fans are powered by appropriate conventional electric Servo or Ratio motor either sensor or manually controlled or both.

Each damper is powered by a conventional shaft mounted ratio motor or a stationary base mounted Servo-motor commanded by sensor signal or manual switch actuators manually controlled.

The conveyor chain powered by appropriate sized conventional ratio or servo electric motor with chain and sprocket drives motors being either sensor or manual controlled.

BRIEF DESCRIPTION OF THE DRAWINGS

FIG. 1 is a side or elevation view of system.

FIG. 2 is a top or plan view of system as herein set forth in specifications and claims. Conventional support systems not shown.

DESCRIPTION OF THE PREFERENTIAL EMBODIMENT (Note: The following sequence of operations occur co-incidentally with each of the equally equipped dual conduction spray tube assemblies, as shown in illustrative drawing FIG. 1 and FIG. 2 as is set forth, unless one of the two said tube assemblies is purposefully deactivated by plan). Initially the hot combustion residual emissions are discharged from orifice A and collected by/in chamber B wherein said emissions' temperature lowers due to ambient air flow from auxiliary fan 1 and from shrouded air ports 8, and any pressure relieved by pressure relief doors 17, thence emissions flow from aperature of conduit collector B by vacuum means created by a series of tube axial fans 2,3, 4,5,6,7 properly spaced and installed in forced air exhaust positions, thus the vacuum embraced emissions flow into and through tube orifice C. thence continue flowing around open damper 10 and fan blades 2 and into high volume pre-cooling liquid (liquid is water) spray tube chamber D. therein and wherein any resultant internal steam pressure is dispersed forthwith and thereout into atmosphere by utility of proximity automatic pressure relief door or doors 12 and 13 thereon and therethrough said tube chamber wall. In continuation of process, said emissions flow from liquid spray tube chamber D in reduced quantity and temperature, thence around and by rotating fan blades 3 and into micromist spray chamber E wherein temperature further reduces as turbulence increases and portions of said emissions' polluted particulate and gas soluble molecules are intercepted by continuous helical spray line Q and subsequently saturated or encapsulated by multiples of micro-mist (water) driplets there-from and consequentially driplets merging into larger droplets while gravitating downward in suspension and subsequently they are provisionally received, in slush form, by utility of dual purpose conveyor guide channel K. (Note: During the foregoing operations, and in all subsequent operations, the sludge flush sprays' 9 sporadically purge all internal surfaces of system, fans inclusive, thusly retarding sludge, scale and corrosive formations there-upon). The foregoing proceedings as stated continue in planned sequence throughout systems' remaining spray chambers F,G,H,J. Wherein each chamber a portion of the pollutants is extracted from the emissions and resultant to the systems' total operational process a collective concentration of pollutants in forms of cohesive particulate and liquid soluble gases in varied quantitative amounts is collected on floor of conveyor guide channel K, whereby physical laws, mostly gravity, the fluids tend to rise and separate from the settled particulates and each concentrates into its individual characteristic, subsequently the conveyors, upper perforated, cross slats L collectively scrape cohesive particulates from floor of guide channel K and discharge same at P; simultaneously the liquid soluble gases flow counter-concurrently from travel direction of conveyor, and in declination, over, under and around open tolerance interstices in the mechanics of slats L, and in supplement, flow through hole or slot perforations in top half of said slats L, thence liquid flows onward by way of channel K to outlet M which is near cleaned environmental air exhaust orifice N.

What I claim:

1. An environmental air pollution control system comprising: a conduit having an inlet aperture for collecting said emissions, a preliminary cooling means comprised of a blower fan in the conduit and multiples of air inlet holes located there-through the conduit walls, emissions conducive means comprised of dual and parallel conduction tubes connected through a common joint connection with the conduit where-by emissions may flow to each of said tubes, emissions removable means in said tubes comprises by means of sequentially spaced rotating axial fans, further emissions cooling means consisting of liquid spray means in said tubes, damper means at inlets of said tubes, emissions cooling liquid contact means comprised of a liquid spiral spray line positioned in the said tubes adjacent to walls thereof, a horizontal desludge perforated spray pipe in said tubes adjacent to fans to direct sprays in contact with walls of said tube and fans' blades' surfaces, comprising a pollutant container means comprised of dual purpose conveyor guide channel means connected to the bottom of said tubes, said channel means having outlets, polluted particulate removable means comprised of mechanical conveyor means in said channel means directing the collected liquids and solids to the outlets.

2. A system as in claim 1 wherein the conduit includes pressure relief means.

3. A system as in claim 1 wherein said conduction tubes includes pressure relief doors.

4. A system as in claim 1 wherein the sludge flush pipe being closed at each end with hollow spherical configurations with perforated walls thereon.

* * * * *